US009672829B2

(12) United States Patent
Chen et al.

(10) Patent No.: US 9,672,829 B2
(45) Date of Patent: Jun. 6, 2017

(54) EXTRACTING AND DISPLAYING KEY POINTS OF A VIDEO CONFERENCE

(71) Applicant: International Business Machines Corporation, Armonk, NY (US)

(72) Inventors: Ye Q. Chen, Shanghai (CN); Wen J. Nie, Ningbo (CN); Ting Wu, Shanghai (CN); Zhao Yang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 14/665,592

(22) Filed: Mar. 23, 2015

(65) Prior Publication Data
US 2016/0284354 A1 Sep. 29, 2016

(51) Int. Cl.
| | | |
|---|---|---|
| *G10L 15/26* | (2006.01) | |
| *G10L 17/02* | (2013.01) | |
| *H04N 7/15* | (2006.01) | |
| *G10L 25/57* | (2013.01) | |
| *H04L 12/18* | (2006.01) | |
| *G10L 25/87* | (2013.01) | |
| *H04N 7/14* | (2006.01) | |

(Continued)

(52) U.S. Cl.
CPC .............. *G10L 17/02* (2013.01); *G10L 15/26* (2013.01); *G10L 25/57* (2013.01); *G10L 25/87* (2013.01); *H04L 12/1831* (2013.01); *H04N 7/147* (2013.01); *H04N 7/15* (2013.01); *G10L 17/00* (2013.01); *G10L 21/10* (2013.01); *H04L 12/1827* (2013.01)

(58) Field of Classification Search
CPC ....... H04N 7/15; G10L 17/10; H04M 2201/41
See application file for complete search history.

(56) References Cited

U.S. PATENT DOCUMENTS 6,100,882 A * 8/2000 Sharman ............ H04L 12/1822
704/235
6,298,129 B1 * 10/2001 Culver ............ H04M 3/42153
379/202.01
(Continued)

FOREIGN PATENT DOCUMENTS

| CN | 101068271 A | 11/2007 |
|---|---|---|
| CN | 102572372 A | 7/2012 |
| CN | 104427292 A | 3/2015 |

OTHER PUBLICATIONS

International Search Report, Application No. PCT/CN2016/073357, May 5, 2016, 11 pgs.

*Primary Examiner* — Jialong He
(74) *Attorney, Agent, or Firm* — Kristofer L. Haggerty

(57) ABSTRACT

Embodiments of the present invention disclose a method, system, and computer program product for speech summarization. A computer receives audio and video components from a video conference. The computer determines which participant is speaking based on comparing images of the participants with template images of speaking and non-speaking faces. The computer determines the voiceprint of the speaking participant by applying a Hidden Markov Model to a brief recording of the voice waveform of the participant and associates the determined voiceprint with the face of the speaking participant. The computer recognizes and transcribes the content of statements made by the speaker, determines the key points, and displays them over the face of the participant in the video conference.

9 Claims, 3 Drawing Sheets

(51) Int. Cl.
*G10L 21/10* (2013.01)
*G10L 17/00* (2013.01)

(56) References Cited

U.S. PATENT DOCUMENTS

| | | | |
|---|---|---|---|
| 6,377,995 B2 | 4/2002 | Agraharam et al. | |
| 6,754,631 B1* | 6/2004 | Din | G10L 17/00 704/270 |
| 6,826,159 B1* | 11/2004 | Shaffer | H04M 3/56 370/259 |
| 7,466,334 B1* | 12/2008 | Baba | G11B 27/034 348/14.06 |
| 7,598,975 B2* | 10/2009 | Cutler | G06K 9/00295 348/14.06 |
| 7,756,923 B2* | 7/2010 | Caspi | H04L 29/06027 348/14.08 |
| 7,920,158 B1 | 4/2011 | Beck et al. | |
| 8,120,638 B2 | 2/2012 | Kenoyer | |
| 8,698,872 B2* | 4/2014 | Begeja | H04N 7/147 348/14.01 |
| 8,909,740 B1* | 12/2014 | Bliss | G06F 1/12 709/219 |
| 2002/0101505 A1* | 8/2002 | Gutta | H04N 7/15 348/14.07 |
| 2003/0187632 A1* | 10/2003 | Menich | G06Q 10/10 704/1 |
| 2004/0021765 A1* | 2/2004 | Kubala | H04N 7/15 348/14.08 |
| 2004/0091086 A1* | 5/2004 | Ortel | H04M 3/56 379/88.02 |
| 2005/0209848 A1* | 9/2005 | Ishii | H04L 12/1831 704/231 |
| 2007/0071206 A1* | 3/2007 | Gainsboro | H04M 3/2281 379/168 |
| 2008/0077952 A1 | 3/2008 | St. Jean et al. | |
| 2008/0088698 A1* | 4/2008 | Patel | H04N 7/15 348/14.09 |
| 2008/0276159 A1* | 11/2008 | Narayanaswami | G06F 17/241 715/202 |
| 2009/0313220 A1* | 12/2009 | Best | G06F 17/30867 |
| 2010/0063815 A1* | 3/2010 | Cloran | G06Q 30/02 704/235 |
| 2011/0112833 A1* | 5/2011 | Frankel | G10L 15/32 704/235 |
| 2011/0112835 A1* | 5/2011 | Shinnishi | G06F 17/2755 704/235 |
| 2011/0267419 A1 | 11/2011 | Quinn et al. | |
| 2011/0305326 A1* | 12/2011 | Poirier | G06Q 50/06 379/88.13 |
| 2012/0053936 A1* | 3/2012 | Marvit | G10L 15/26 704/235 |
| 2012/0265518 A1* | 10/2012 | Lauder | G06F 17/2854 704/3 |
| 2012/0326993 A1 | 12/2012 | Weisman | |
| 2013/0162752 A1* | 6/2013 | Herz | H04N 7/15 348/14.08 |
| 2013/0198177 A1* | 8/2013 | Oldham | G06F 3/0482 707/731 |
| 2013/0311595 A1 | 11/2013 | Milatinovici et al. | |
| 2014/0081634 A1* | 3/2014 | Forutanpour | G06F 17/289 704/235 |
| 2014/0100849 A1* | 4/2014 | Rasmussen | H04L 12/1831 704/246 |
| 2014/0164317 A1* | 6/2014 | Lynch | G06Q 10/02 707/609 |
| 2014/0340467 A1* | 11/2014 | Kajarekar | H04N 7/15 348/14.08 |
| 2014/0365922 A1* | 12/2014 | Yang | H04L 51/32 715/758 |
| 2015/0049247 A1* | 2/2015 | Kajarekar | H04N 7/147 348/484 |
| 2015/0052211 A1* | 2/2015 | Kim | H04L 12/1827 709/206 |
| 2015/0287403 A1* | 10/2015 | Holzer Zaslansky | G06T 13/205 704/231 |

\* cited by examiner

EXTRACTING AND DISPLAYING KEY POINTS OF A VIDEO CONFERENCE

TECHNICAL FIELD

The present invention relates generally to speech analysis, and more particularly to determining the key points made by a speaker during a video conference.

BACKGROUND

Video conferencing is often used for business and personal use as an effective and convenient communication method that bypasses the need to physically travel to a location to have a face to face conversation. Video conferences are becoming increasingly popular because a single video conference can simultaneously connect hundreds of people from anywhere on the planet to a live, face to face conversation. Like in any conversation, however, video conferences may be impeded by language barriers, unrecognizable accents, fast speaking, or the chance that attendees arrive late to a multi-person conference and miss what was previously discussed.

SUMMARY

Embodiments of the present invention disclose a method, system, and computer program product for speech summarization. A computer receives audio and video components from a video conference. The computer determines which participant is speaking based on comparing images of the participants with template images of speaking and non-speaking faces. The computer determines the voiceprint of the speaking participant by applying a Hidden Markov Model to a brief recording of the voice waveform of the participant and associates the determined voiceprint with the face of the speaking participant. The computer recognizes and transcribes the content of statements made by the speaker, determines the key points, and displays them over the face of the participant in the video conference.

DETAILED DESCRIPTION

Embodiments of the present invention will now be described in detail with reference to the accompanying figures.

Figure 1:
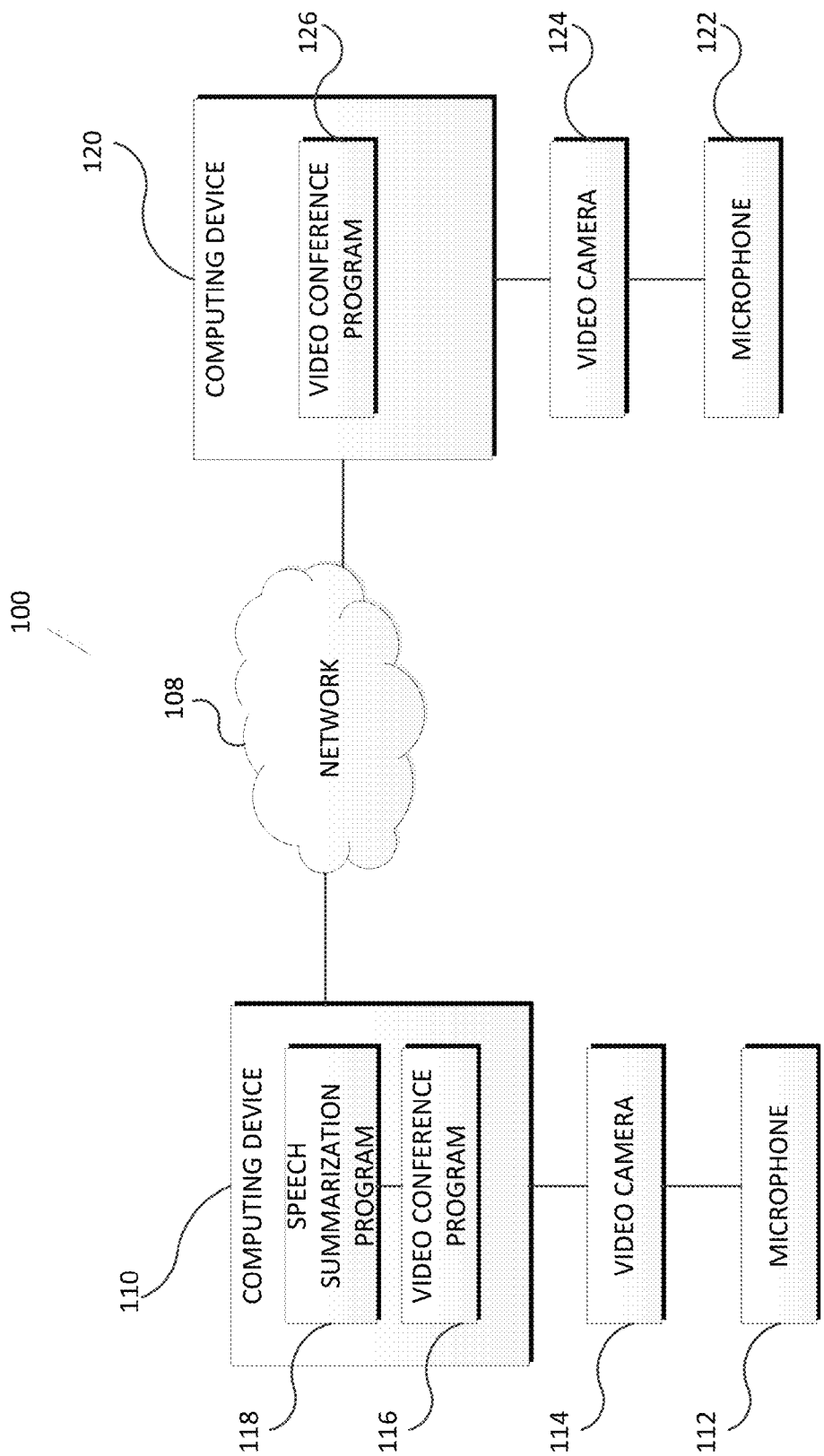
FIG. 1 illustrates a speech summarization system, in accordance with an embodiment of the invention.

FIG. 1 illustrates a speech summarization system 100, in accordance with an embodiment of the invention. In the example embodiment, the speech summarization system 100 includes computing device 110, video camera 114, microphone 112, computing device 120, video camera 124, microphone 122, and network 108.

Network 108 may be the Internet, representing a worldwide collection of networks and gateways to support communications between devices connected to the Internet. Network 108 may include, for example, wired, wireless or fiber optic connections. In other embodiments, network 108 may be implemented as an intranet, a local area network (LAN), or a wide area network (WAN). In general, network 108 can be any combination of connections and protocols that will support communications between computing device 110 and computing device 120.

Microphone 122 may be an acoustic-to-electric transducer that converts air pressure variations created by sound into an electrical signal. In the example embodiment, microphone 112 is integrated with computing device 120. Microphone 112 converts statements made by the user of computing device 110 to electrical signals and transmits the electrical signals to computing device 120.

Video camera 124 may be a camera used for motion picture acquisition. In the example embodiment, video camera 124 is integrated with computing device 120 and visually records the user of computing device 120 while in a video conference.

Computing device 120 includes video conference program 126 and speech summarization program 128. In the example embodiment, computing device 120 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 120 is shown as a single device, in other embodiments, computing device 120 may be comprised of a cluster or plurality of computing devices, working together or working separately. Computing device 120 is described in more detail with reference to FIG. 3.

Video conference program 126 is a program capable of providing capabilities to allow users to video conference by way of transmitting audio and video feeds between computing devices. In the example embodiment, video conference program 126 transmits audio and video feeds to other computing devices, such as computing device 110, via a network, such as network 108. In other embodiments, video conference program 126 may transmit audio and video feeds via a wired connection.

Microphone 112 may be an acoustic-to-electric transducer that converts air pressure variations created by sound into an electrical signal. In the example embodiment, microphone 112 is integrated with computing device 110. Microphone 112 converts statements made by the user of computing device 110 to electrical signals and transmits the electrical signals to computing device 110.

Video camera 114 may be a camera used for motion picture acquisition. In the example embodiment, video camera 114 is integrated with computing device 110 and visually records the user of computing device 110 while in a video conference.

Computing device 110 includes video conference program 116 and speech summarization program 118. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 3.

Video conference program 116 is a program capable of providing capabilities to allow users to video conference by way of transmitting audio and video feeds between computing devices. In the example embodiment, video conference program 116 transmits audio and video feeds to other computing devices, such as computing device 120, via a network, such as network 108. In other embodiments, video conference program 116 may transmit audio and video feeds via a wired connection.

In the example embodiment, speech summarization program 118 is partially integrated with video conference program 116 and receives the audio and video feeds transmitted to video conference program 116. In other embodiments, however, speech summarization program 118 may be fully integrated or not integrated with video conference program 116. Speech summarization program 118 is capable of identifying the voiceprint, or unique voice waveform parameters, of a speaker in the audio feed, for example, by utilizing a Hidden Markov Model (HMM) to analyze common acoustic-phonetic characteristics including the decibel range, frequency spectrum, formant, fundamental tone, and reflection coefficient. Speech summarization program 116 is additionally capable of identifying the speaker in the video feed by analyzing the facial expressions of participants using a template based facial recognition method. Furthermore, speech summarization program 116 is capable of matching the voiceprint of a speaker in the audio feed with the face of the speaker in the video feed and storing the voiceprint of the speaker in a user database. In the example embodiment, the voiceprint database is stored locally on computing device 110, however in other embodiments, the voiceprint database may be stored remotely and accessed via network 108. Speech summarization program 116 is also capable of determining and transcribing the content of a statement made by the speaker by utilizing a HMM. Furthermore, speech summarization program 116 is capable of determining the key points made by the speaker and displaying a bubble listing the most recently made key points above the speaker in the video feed. The operations of speech summarization program is described in further detail in the discussion of FIG. 2.

Figure 2:
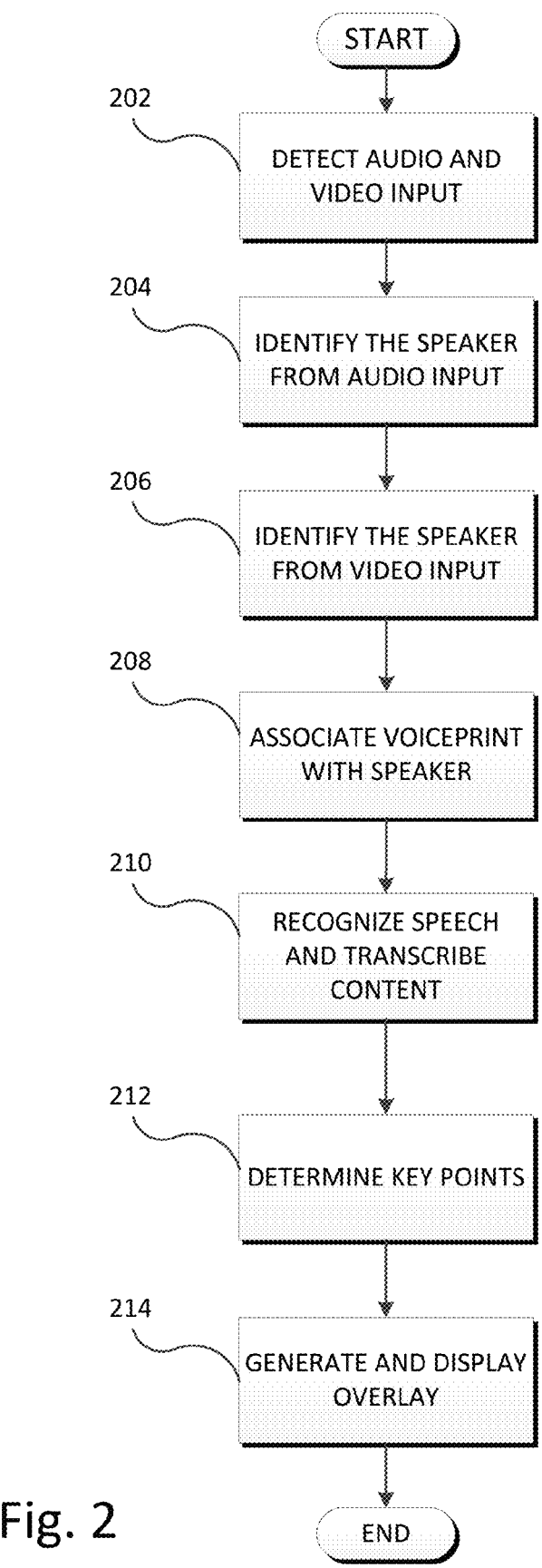
FIG. 2 is a flowchart illustrating the operations of a speech summarization program of FIG. 1 for determining and displaying the key points made by a speaker in a video conference call, in accordance with an embodiment of the invention.

FIG. 2 is a flowchart depicting the operation of speech summarization program 118 in determining and displaying the key points made by a speaker in a video conference, in accordance with an embodiment of the present invention. In the example embodiment where speech summarization program 118 is integrated with video conference program 116, speech summarization program 118 detects the audio and video feeds of a video conference by way of integration with video conference program 116 (step 202). In other embodiments where speech summarization program 118 is not integrated with video conference program 116, speech summarization program 118 detects the audio and video feeds of a video conference by way of user input or communication with the operating system. For example, if participant Alpha is utilizing video conference program 116 on computing device 110 for a video conference with participant Beta on computing device 120, then speech summarization program 118 of computing device 110 detects the audio and video feeds from participant Beta on computing device 120 from video conference program 116.

In the example embodiment where speech summarization program 118 is integrated with video conference program 116, speech summarization program 118 identifies the voiceprint of the speaker from the audio data received via video conference program 116, however in other embodiments where speech summarization program 118 is not integrated with video conference program 116, speech summarization program 118 may identify the voiceprint of the speaker from audio feed data received via network 108 (step 204). In the example embodiment, speech summarization program 118 identifies the voiceprint of the speaker utilizing a Hidden Markov Model (HMM), however, in other embodiments speech summarization program 116 may identify a voiceprint utilizing other voice biometric techniques such as frequency estimation, Gaussian mixture models, pattern matching algorithms, neural networks, matrix representation, Vector Quantization, decision trees and cohort models. Speech summarization program 118 utilizes a Hidden Markov Model to analyze common acoustic-phonetic characteristics such as decibel range, frequency spectrum, formant, fundamental tone, and reflection coefficient. As a statement is made by a participant in the video conference, speech summarization program 118 analyzes a brief recording of the voice waveform to extract a model, or voiceprint, defining the parameters of the aforementioned acoustic-phonetic characteristics. The brief recording may correspond to a recording lasting about ten milliseconds, however other lengths may be used as well. Speech summarization program 118 then attempts to match that voiceprint with an existing voiceprint in a voiceprint database stored on computing device 110. In the example embodiment, participants of the video conference state their name at the outset of the video conference in order for speech summarization program 118 to identify and store their voiceprint in the voiceprint database. Participants stating their name provides speech summarization program 118 an opportunity to identify and store the voiceprint of the participant, and also provides speech summarization program 118 an opportunity to recognize and identify a name or identifier to associate with that voiceprint (speech recognition techniques to identify the spoken name are discussed in further detail in step 210). For example, if participant Charlie joins participant Beta on computing device 120 in the conference call with participant Alpha described above, speech summarization program 118 on computing device 110 must distinguish between two audio feeds (Beta and Charlie). Speech summarization program 118 determines the two different voiceprints of Beta and Charlie by analyzing the voice waveform of both Beta and Charlie over a brief period of time and extracting the characteristic parameters. Speech summarization program 118 then attempts to match the voiceprints of Beta and Charlie to existing voiceprints in the voiceprint database. If participants Beta and Charlie are new participants, speech summarization program may not find a match in the voiceprint database and the voiceprints of participants Beta and Charlie may be added to the voiceprint database under the names Beta and Charlie if stated at the outset of the meeting. If participants Beta and Charlie have existing voiceprints in the voiceprint database, statements made by participants Beta and Charlie may be associated with existing voiceprint information corresponding to participants Beta and Charlie.

Speech summarization program 118 identifies the face of the speaker from the video feed received via network 108 (step 206). In the example embodiment, speech summarization program 118 identifies the speaker from the video feed utilizing a template matching approach, however, in other embodiments speech summarization program 116 may utilize geometric based approaches, piecemeal/wholistic approaches, or appearance-based/model-based approaches. Template matching is a technique in digital image processing for finding small parts of an image which match a template image. Utilizing a template based approach, speech summarization program 118 compares the face of a speaker in the video feed with a set of stored templates. The templates include photos of random human faces preloaded into speech summarization program 118, some speaking and some not speaking. Speech summarization program 118 utilizes template matching by first taking an image of the faces of the participants in the video feed(s) as a voiceprint is determined. Speech summarization program 118 then compares the images to the stored templates to determine whether the face of the speaker in the video feed images resembles a speaking face or a non-speaking face in the templates by sampling a large number of pixels from each image and determining whether the pixels match in shade, brightness, color, and other factors. Continuing the example above with users Alpha, Beta, and Charlie conducting a video conference, speech summarization program 118 on computing device 110 compares the stored templates to the faces of users Beta and Charlie in the video feed to determine who is speaking at a particular instant. If Charlie is speaking, then his face in the video feed will resemble the template of a speaking person's face and speech summarization program 118 determines that participant Charlie is speaking.

Speech summarization program 118 associates the voiceprint of a participant identified in step 204 with the speaker identified in step 206 (step 208). Speech summarization program 118 determines which participant's face in the video feed indicates that the participant is speaking as speech summarization program 118 identifies the voiceprint of the speaker. Speech summarization program 118 then associates that voiceprint with the face identified in the video feed and, if the voiceprint is associated with a name (or other identifier), associates the name with the face as well. Continuing the example above where user Alpha is conducting a video conference on computing device 110 with users Beta and Charlie (participating on computing device 120), if, as a voiceprint is identified, speech summarization program 118 determines that Charlie is speaking based on template matching of his facial expressions, speech summarization program 118 associates the identified voiceprint with the face of participant Charlie. Additionally, if Charlie introduces himself as "Charlie" at the outset of the meeting or his voiceprint is otherwise associated with the name "Charlie," (described in step 204), speech summarization program 118 will associate the face of Charlie not only with the voiceprint, but with the name "Charlie" as well.

Speech summarization program 118 determines the content of the speech and transcribes the content of the speech made by a speaker (step 210). In the example embodiment, speech summarization program 118 recognizes the speech of statements made by a speaker utilizing a Hidden Markov Model (HMM), however, in other embodiments speech summarization program 106 may transcribe the content of a statement made by a speaker utilizing methods such as phonetic transcription, orthographic transcription, dynamic time warping, neural networks, or deep neural networks. A Hidden Markov Model (HMM) is statistical model that outputs a sequence of symbols or quantities. HMMs are used in speech recognition because a speech signal can be viewed as a piecewise stationary signal and in these short lengths of time, speech can be approximated as a stationary process. HMMs output a sequence of n-dimensional real-valued vectors approximately every ten milliseconds, each vector representing a phoneme (basic unit of a language's phonology that is combined with other phonemes to form words). The vectors consist of the most significant coefficients, known as cepstral coefficients, decorrelated from a spectrum that is obtained by applying a cosine transform to the Fourier transform of the short window of speech analyzed. The resulting statistical distribution is a mixture of diagonal covariance Gaussians which give a likelihood for each observed vector, or likelihood for each phoneme. The output distribution, or likelihood, of each phoneme is then used to concatenate the individual HMMs into words and sentences.

Speech summarization program 118 stores the transcribed content of the entire meeting locally on computing device 110 in a file associated with the video conference. In the aforementioned example, if participant Charlie states "I think we should sell," speech summarization program 118 may break the statement down into piecewise stationary signals and create HMMs of the phonemes making up the words of the statement. Speech summarization program 118 may further concatenate the resulting output distributions to determine the words and sentences Charlie has stated. Further, if the name "Charlie" is associated with the voiceprint of Charlie, speech summarization program 118 transcribes "Charlie: I think we should sell" in the file associated with the meeting. If the name "Charlie" is not associated with the voiceprint of Charlie, however, speech summarization program 118 transcribes "Unidentified Participant 1: I think we should sell" in the file associated with the meeting.

Speech summarization program 118 determines the key points made within the statements transcribed in step 210 (step 212). In the example embodiment, speech summarization program 118 determines key points by utilizing several methods, including monitoring for preselected keywords designated by participants or the host of the meeting, monitoring for words used in high frequency during the meeting after filtering out common verbiage (i.e. filtering words such as "and" and "the"), and monitoring the tone, pitch, and speaking speed of a speaker. Speech summarization program 118 detects changes in speaker tone and pitch by monitoring for variations from the voiceprint of a particular speaker in decibel range, formant, and the other aforementioned acoustic-phonetic characteristics. Additionally, speech summarization program 118 detects changes in speaker speaking speed by monitoring for variations from the average words per second of the speaker. Continuing the example video conference between Alpha, Beta, and Charlie described above, speech summarization program 118 may transcribe statements made by Charlie and determine that Charlie has spoken the preselected keywords "investment," "sale," and "profit." Additionally, speech summarization program 118 may determine Charlie repeated the word "stock" three times, and that Charlie slowed his speech and changed the tone of his voice to emphasize the words "market crash." Speech summarization program 118 may determine that Charlie's key points were made in regards to his statements about an investment, a sale, a profit, a stock, and a market crash.

Speech summarization program 118 generates and displays an overlay listing a speaker's statements that were determined key points in step 212 (step 214). In the example embodiment, the most recent key points are listed in a semi-opaque bubble displayed above the speaker in the video feed so it can be seen by participants of the video conference. Additionally, a user may hover over the bubble with their mouse to expand the list of recent key points to include all of the key points made by the particular speaker throughout the duration of the video conference. Continuing the example above where Charlie made a statement and speech summarization program 118 determined that the sentences containing the words "investment," "sale," "profit," "stock," and "market crash" were key points. As the statements containing the words "market crash," "stock," and "profit" were the most recent key points made by Charlie, the statements containing these points would be displayed in a semi-opaque bubble above Charlie's face in the video feed for other participants to read. Additionally, if a participant hovers their mouse over the semi-opaque bubble above Charlie, the list will expand to also include the statements containing the words "sale" and "investment."

Figure 3:
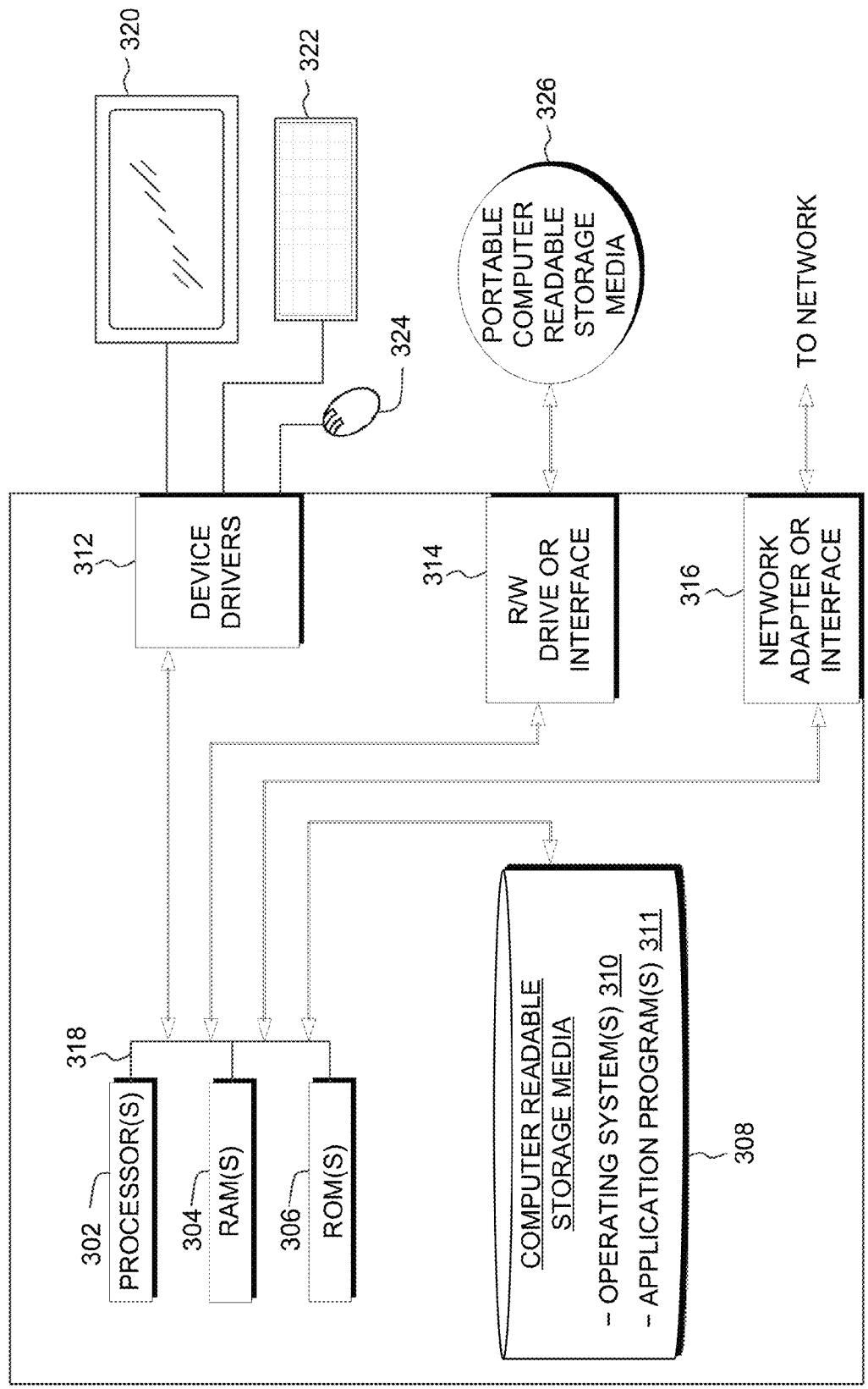
FIG. 3 is a block diagram depicting the hardware components of a speech summarizing system of FIG. 1, in accordance with an embodiment of the invention.

FIG. 3 depicts a block diagram of components of computing device 110 of a speech summarization system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311, for example, speech summarization program 118, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 314 to read from and write to one or more portable computer readable storage media 326. Application programs 311 on computing device 110 may be stored on one or more of the portable computer readable storage media 326, read via the respective R/W drive or interface 314 and loaded into the respective computer readable storage media 308.

Computing device 110 may also include a network adapter or interface 316, such as a TCP/IP adapter card or wireless communication adapter (such as a 4G wireless communication adapter using OFDMA technology). Application programs 311 on computing device 110 may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Computing device 110 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for summarizing speech, the method comprising:
   receiving data corresponding to a video conference, including an audio component and a video component;
   determining a first participant is speaking based on comparing one or more images of the first participant contained in the video component with one or more template images;
   determining a voiceprint of the first participant based on the received audio component, wherein the voiceprint of the first participant includes information detailing one or more unique parameters of a voice waveform of the first participant;
   associating the determined voiceprint of the first participant with at least one of the one or more images of the first participant;
   determining one or more key points within content spoken by the first participant;
   based on detecting the first participant within the video component, overlaying one or more most recent key points of the one or more key points within the video component, wherein the one or more most recent key points are displayed in close spatial proximity to the first participant to indicate an association between the one or more key points and the first participant;
   receiving a user input to the overlaid one or more most recent key points; and
   based on receiving the user input to the overlaid one or more most recent key points, expanding the overlay to include both the one or more most recent key points and the one or more key points,
   wherein one or more steps of the above method are performed using one or more computers.

2. The method of claim 1, wherein determining one or more key points within content spoken by the first participant further comprises:
   detecting a change in a speaking speed of the first participant based on a deviation from an average spoken words per second of the first participant.

3. The method of claim 1, wherein determining one or more key points within content spoken by the first participant further comprises:
   detecting one or more terms used frequently.

4. A computer program product for a speech summarization system, the computer program product comprising:
   one or more computer-readable storage media and program instructions stored on the one or more computer-readable storage media, the program instructions comprising:

program instructions to receive data corresponding to a video conference, including an audio component and a video component;

program instructions to determine a first participant is speaking based on comparing one or more images of the first participant contained in the video component with one or more template images;

program instructions to determine a voiceprint of the first participant based on the received audio component, wherein the voiceprint of the first participant includes information detailing one or more unique parameters of a voice waveform of the first participant;

program instructions to associate the determined voiceprint of the first participant with at least one of the one or more images of the first participant;

program instructions to determine one or more key points within content spoken by the first participant;

based on detecting the first participant within the video component, program instructions to overlay one or more most recent key points of the one or more key points within the video component, wherein the one or more most recent key points are displayed in close spatial proximity to the first participant to indicate an association between the one or more key points and the first participant;

program instructions to receive a user input to the overlaid one or more most recent key points; and based on receiving the user input to the overlaid one or more most recent key points, program instructions to expand the overlay to include both the one or more most recent key points and the one or more key points.

5. The computer program product of claim 4, wherein determining one or more key points within the content spoken by the first participant further comprises:

program instructions to detect a change in a speaking speed of the first participant based on a deviation from an average spoken words per second of the first participant.

6. The computer program product of claim 4, wherein determining one or more key points within the content spoken by the first participant further comprises:

detecting one or more terms used frequently.

7. A computer system for a speech summarization system, the computer system comprising:

one or more computer processors, one or more computer-readable storage media, and program instructions stored on one or more of the computer-readable storage media for execution by at least one of the one or more processors, the program instructions comprising:

program instructions to receive data corresponding to a video conference, including an audio component and a video component;

program instructions to determine a first participant is speaking based on comparing one or more images of the first participant contained in the video component with one or more template images;

program instructions to determine a voiceprint of the first participant based on the received audio component, wherein the voiceprint of the first participant includes information detailing one or more unique parameters of a voice waveform of the first participant;

program instructions to associate the determined voiceprint of the first participant with at least one of the one or more images of the first participant;

program instructions to determine one or more key points within content spoken by the first participant;

based on detecting the first participant within the video component, program instructions to overlay one or more most recent key points of the one or more key points within the video component, wherein the one or more most recent key points are displayed in close spatial proximity to the first participant to indicate an association between the one or more key points and the first participant;

program instructions to receive a user input to the overlaid one or more most recent key points; and based on receiving the user input to the overlaid one or more most recent key points, program instructions to expand the overlay to include both the one or more most recent key points and the one or more key points.

8. The computer system of claim 7, wherein determining one or more key points within the content spoken by the first participant further comprises:

program instructions to detect a change in a speaking speed of the first participant based on a deviation from an average spoken words per second of the first participant.

9. The computer system of claim 7, wherein determining one or more key points within the content spoken by the first participant further comprises:

detecting one or more terms used frequently.

* * * * *